(12) United States Patent
Reiser

(10) Patent No.: US 6,521,367 B2
(45) Date of Patent: Feb. 18, 2003

(54) FUEL CELL WITH AN ELECTROLYTE DRY-OUT BARRIER

(75) Inventor: Carl Anthony Reiser, Stonington, CT (US)

(73) Assignee: UTC Fuel Cells, LLC, South Windsor, CT (US)

( * ) Notice: Subject to any disclaimer, the term of this patent is extended or adjusted under 35 U.S.C. 154(b) by 118 days.

(21) Appl. No.: 09/731,307

(22) Filed: Dec. 6, 2000

(65) Prior Publication Data

US 2002/0068214 A1 Jun. 6, 2002

(51) Int. Cl.[7] .................................................. H01M 2/00
(52) U.S. Cl. .............................. 429/34; 429/35; 429/38
(58) Field of Search .............................. 429/39, 38, 36, 429/34, 26, 35

(56) References Cited

U.S. PATENT DOCUMENTS

| 4,743,518 A |   | 5/1988 | Romanowski |
|---|---|---|---|
| 4,824,741 A |   | 4/1989 | Kunz |
| 5,641,586 A | * | 6/1997 | Wilson et al. ................. 429/30 |
| 6,020,083 A | * | 2/2000 | Breault et al. ................. 429/30 |

* cited by examiner

Primary Examiner—Stephen Kalafut
Assistant Examiner—R Alejandro
(74) Attorney, Agent, or Firm—Malcolm J. Chisholm, Jr.

(57) ABSTRACT

The invention is a fuel cell with an electrolyte dry-out barrier to restrict loss of water from the electrolyte. The fuel cell includes: an anode catalyst and a cathode catalyst secured to opposed sides of an electrolyte; an anode flow field disposed adjacent the anode catalyst for directing the reducing fluid to pass adjacent the anode catalyst, and a cathode flow field disposed adjacent the cathode catalyst for directing the process oxidant stream to pass adjacent the cathode catalyst; and, an anode electrolyte dry-out barrier secured between the electrolyte and the anode flow field for restricting transfer of water from the electrolyte into the anode flow field. The anode electrolyte dry-out barrier extends from adjacent an entire reducing fluid inlet and along an entire reducing fluid flow path a distance that is adequate for the reducing fluid stream flowing through the anode flow field to become saturated with water. The fuel cell may also include a cathode electrolyte dry-out barrier secured between the electrolyte and the cathode flow field. The anode and/or cathode electrolyte dry-out barriers may consist of polymeric sealants coating or impregnating barrier regions of porous layers between the electrolyte and the anode and/or cathode flow fields.

13 Claims, 3 Drawing Sheets

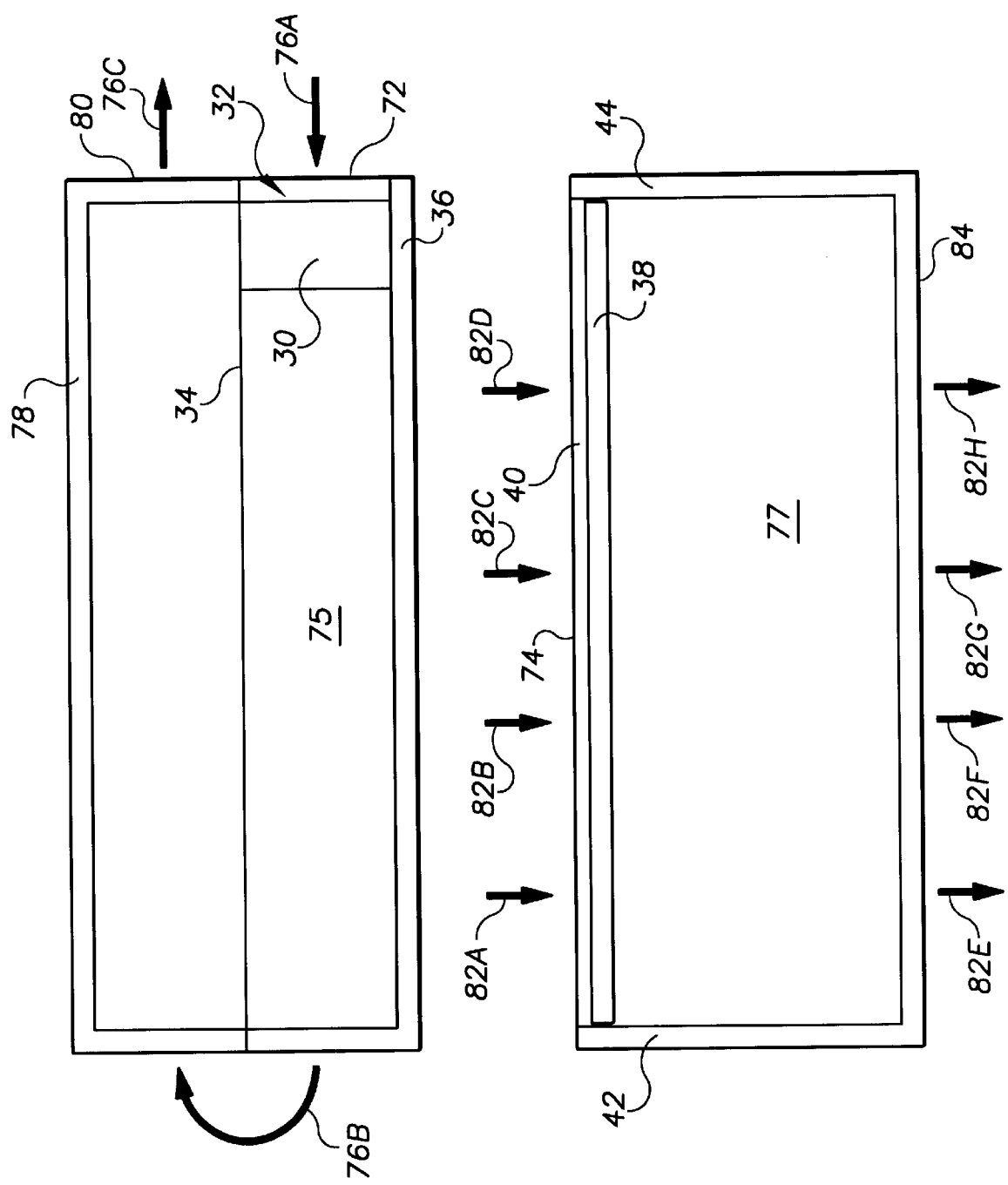

FUEL CELL WITH AN ELECTROLYTE DRY-OUT BARRIER

TECHNICAL FIELD

The present invention relates to fuel cells that are suited for usage in transportation vehicles, portable power plants, or as stationary power plants, and the invention especially relates to a fuel cell having at least one electrolyte dry-out barrier for restricting transfer of water out of the electrolyte.

BACKGROUND OF THE INVENTION

Fuel cells are well-known and are commonly used to produce electrical energy from reducing and oxidizing reactants fluids to power electrical apparatus such as apparatus on-board space vehicles, or on-site generators for buildings. A plurality of planar fuel cells are typically arranged in a stack surrounded by an electrically insulating frame structure that defines manifolds for directing flow of reducing, oxidant, coolant and product fluids as part of a fuel cell power plant. Each individual fuel cell generally includes an anode electrode and a cathode electrode separated by an electrolyte. A reducing fluid such as hydrogen is supplied to the anode electrode, and an oxidant such as oxygen or air is supplied to the cathode electrode. In a cell utilizing a proton exchange membrane ("PEM") as the electrolyte, the hydrogen electrochemically reacts at a catalyst surface of the anode electrode to produce hydrogen ions and electrons. The electrons are conducted to an external load circuit and then returned to the cathode electrode, while the hydrogen ions transfer through the electrolyte to the cathode electrode, where they react with the oxidant and electrons to produce water and release thermal energy.

The anode and cathode electrodes of such fuel cells are separated by different types of electrolytes depending on operating requirements and limitations of the working environment of the fuel cell. One such electrolyte is the aforesaid proton exchange membrane ("PEM") electrolyte, which consists of a solid polymer well-known in the art. Other common electrolytes used in fuel cells include phosphoric acid or potassium hydroxide held within a porous, non-conductive matrix between the anode and cathode electrodes. It has been found that PEM cells have substantial advantages over cells with liquid acid or alkaline electrolytes in satisfying specific operating parameters because the membrane of the PEM provides a barrier between the reducing fluid and oxidant that is more tolerant to pressure differentials than a liquid electrolyte held by capillary forces within a porous matrix. Additionally, the PEM electrolyte is fixed, and cannot be leached from the cell, and the membrane has a relatively stable capacity for water retention.

In operation of PEM fuel cells, it is critical that a proper water balance be maintained between a rate at which water is produced at the cathode electrode ("product water") including water resulting from proton drag ("drag water") through the PEM electrolyte and rates at which water is removed from the cathode and at which water is supplied to the anode electrode. An operational limit on performance of a fuel cell is defined by an ability of the cell to maintain the water balance as electrical current drawn from the cell into the external load circuit varies and as an operating environment of the cell varies. For PEM fuel cells, if insufficient water is returned to the anode electrode, adjacent portions of the PEM electrolyte dry-out thereby decreasing the rate at which hydrogen ions may be transferred through the PEM and also resulting in cross-over of the reducing fluid leading to local over heating and substantial degradation of performance of the fuel cell. Additionally, if too much water is removed from the cathode, the PEM may dry out limiting ability of hydrogen ions to pass through the PEM, thus decreasing cell performance which could also result in cross-over of the reducing fluid leading to over heating and further degradation of performance of the cell.

Many efforts in fuel cell development have been undertaken to maintain a proper fuel cell water balance and to ensure in particular that a PEM electrolyte does not dry out. For example, it is known to add porous water transport plates adjacent porous anode and/or cathode support layers to facilitate liquid water transport to the anode and/or cathode surfaces of the electrolyte; to form reactant gas distribution channels within the water transport plates in order to facilitate movement of water into the reactant gasses and thereby restrict movement of water out of the electrolyte into the reactant gases; to integrate a humidifying component to add moisture to the gaseous reactant streams entering the cell to limit a possibility of drying out of the electrolyte; to integrate a condensing loop external to the cell to condense moisture within an exiting oxidant stream such as by a heat exchange relationship with ambient air and to then return the condensed moisture to porous support layers adjacent the anode electrode; and, to generate a pressure differential on the anode side of the cell wherein the reactant gases are maintained at a slightly higher pressure than coolant water and anode supply water passing through porous water transport plates and/or porous support layers adjacent the electrolyte, so that the pressure differential assists water transport through the porous support layers toward the electrolyte (as shown in U.S. Pat. No. 5,503,944 to Meyer et al., and assigned to the assignee of the present invention).

These improvements have significantly enhanced fuel cell operating efficiencies. However, PEM fuel cells in particular still suffer operational limits related to dry-out of the electrolyte, especially during long-term operation. Through exhaustive experimentation, it has been determined that usage of zero relative humidity reactant streams entering a PEM fuel cell having a porous water transport plate in fluid communication with the electrolyte eventually causes a drying out of the PEM electrolyte immediately adjacent reducing fluid and process oxidant inlets to the cell. It appears that until the reactant streams are saturated with water, the PEM electrolyte transfers some portion of water into the reactant streams.

Accordingly, there is a need for a fuel cell that can operate with zero relative humidity reducing fluid and process reactant streams passing through the fuel cell without unacceptable drying out of the electrolyte.

DISCLOSURE OF THE INVENTION

The invention is a fuel cell with an electrolyte dry-out barrier, wherein the fuel cell produces electrical energy from reducing fluid and process oxidant reactant streams. The fuel cell includes: an anode catalyst and a cathode catalyst secured to opposed sides of an electrolyte; an anode flow field disposed adjacent the anode catalyst for directing the reducing fluid to pass adjacent the anode catalyst, and a cathode flow field disposed adjacent the cathode catalyst for directing the process oxidant stream to pass adjacent the cathode catalyst; and, an anode electrolyte dry-out barrier secured between the electrolyte and the anode flow field for restricting transfer of water from the electrolyte into the anode flow field. The anode electrolyte dry-out barrier extends from adjacent an entire reducing fluid inlet and along an entire reducing fluid flow path a distance that is adequate for the reducing fluid stream flowing along the reducing fluid flow path to become saturated with water from the anode flow field. The fuel cell may also include a cathode electrolyte dry-out barrier secured between the electrolyte and the cathode flow field for restricting transfer of water from the electrolyte into the cathode flow field. The cathode electrolyte dry-out barrier extends from adjacent an entire oxidant inlet and along an entire process oxidant flow path a distance that is adequate for a process oxidant stream flowing along the process oxidant flow path to become saturated with water.

In a preferred embodiment, the anode and cathode flow fields may be defined by channels in water transport plates and by open pore spaces in porous support and/or gas diffusion layers adjacent the anode and cathode catalysts so that water from the water transport plates moves into the flow fields to saturate the reducing fluid and process oxidant streams. A preferred distance the anode electrolyte dry-out barrier extends along the reducing fluid flow path is at least three per cent of a length of the reducing fluid flow path, wherein the length of the reducing fluid flow path is from a beginning point of the reducing fluid flow path at the reducing fluid inlet through a shortest distance of the reducing fluid flow path through the anode flow field to an end point of the reducing fluid flow path where the reducing fluid leaves the anode flow field. A preferred distance the cathode electrolyte dry-out barrier extends along the process oxidant flow path is at least five per cent of a length of the process oxidant flow path, wherein the length of the process oxidant flow path is from a beginning point of the process oxidant flow path at the oxidant inlet through a shortest distance of the process oxidant flow path through the cathode flow field to a process oxidant flow path end point where the process oxidant leaves the cathode flow field. The anode and cathode electrolyte dry-out barriers may be formed by applying a coating or a film to a porous support, gas diffusion layer or water transport plate between the electrolyte and the respective anode or cathode flow field. The coating or film may consist of dry-out barrier materials compatible with a working environment of a fuel cell, such as a plastic, polymer, elastomer or resin material with low water absorption properties, a ceramic, or a metal. Additionally, the porous support or gas diffusion layer may be impregnated with dry-out barrier materials.

By providing the fuel cell with anode and cathode electrolyte dry-out barriers, the fuel cell may receive very dry reducing fluid and process oxidant streams having a zero per cent relative humidity without fear of drying out the electrolyte adjacent the reducing fluid and/or process oxidant inlets. Where the electrolyte is a proton exchange membrane ("PEM"), such drying out may lead to reactant gas cross over and consequent degradation of operation of the fuel cell.

Accordingly, it is a general object of the present invention to provide a fuel cell with an electrolyte dry-out barrier that overcomes deficiencies of prior art fuel cells.

It is a more specific object to provide a fuel cell with an electrolyte dry-out barrier that does not significantly decrease performance of the fuel cell.

It is yet another object to provide a fuel cell with an electrolyte dry-out barrier that can be readily secured to a fuel cell without any significant increase in size of the fuel cell.

It is still a further object to provide a fuel cell with an electrolyte dry-out barrier that may be selectively applied to either an anode or cathode side of the fuel cell.

It is another specific object to provide a fuel cell with an electrolyte dry-out barrier that is inexpensive to manufacture and to secure within a fuel cell.

These and other objects and advantages of this invention will become more readily apparent when the following description is read in conjunction with the accompanying drawings.

BRIEF DESCRIPTION OF THE DRAWINGS

FIG. 3 is a cross-sectional, schematic view of the FIG. 1 fuel cell taken along view line 3—3 of FIG. 2, showing the anode electrolyte dry-out barrier of the present invention.

FIG. 4 is a cross-sectional, schematic view of the FIG. 1 fuel cell taken along view line 4—4 of FIG. 2, showing the cathode electrolyte dry-out barrier of the present invention.

DESCRIPTION OF THE PREFERRED EMBODIMENTS

Figure 1:
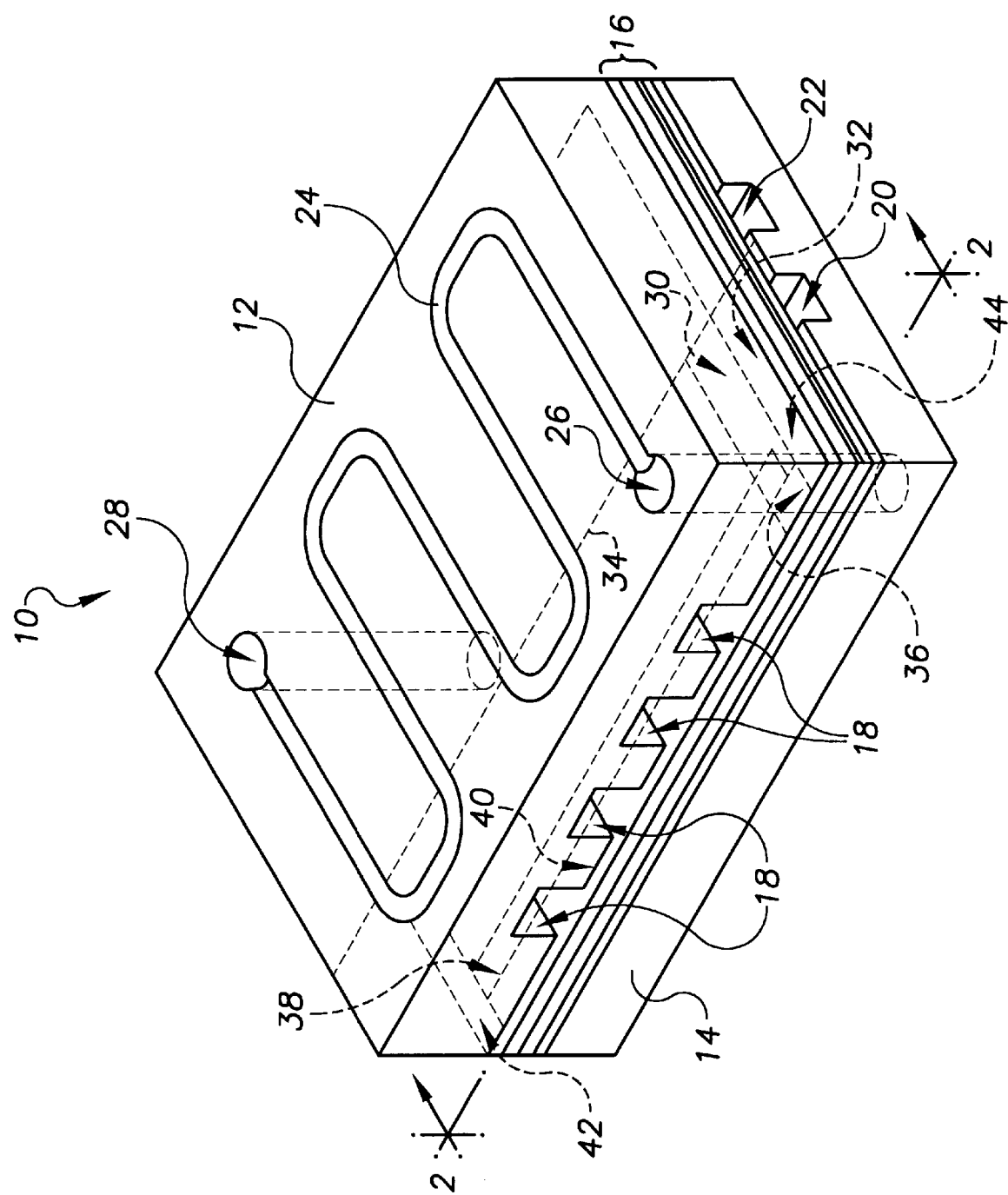
FIG. 1 is a perspective view of a schematic representation of a fuel cell utilizing an electrolyte dry-out barrier constructed in accordance with the present invention.

Referring to the drawings in detail, a fuel cell with an electrolyte dry-out barrier constructed in accordance with the present invention is shown in FIG. 1, and is generally designated by the reference numeral 10. The fuel cell 10 includes a cathode water transport plate 12, an anode water transport plate 14, and a membrane electrode assembly ("MEA") 16 secured between the plates 12, 14. The cathode water transport plate 12 directs water to and from the fuel cell 10 and defines a plurality of air flow or oxidant inlet channels 18 for directing a process oxidant stream to pass through the fuel cell 10. The anode water transport plate 14 also directs water to and from the fuel cell 10 and defines a reducing fluid inlet channel 20 and a reducing fluid outlet channel 22. The cathode water transport plate 12 also defines a coolant flow channel 24 that directs flow of a coolant fluid from a first coolant port 26 to a second coolant port 28.

FIG. 1 also shows in hatched lines an anode electrolyte dry-out barrier 30 secured adjacent a reducing fluid inlet 32 and between a reducing fluid flow barrier 34 and a first reducing fluid edge seal 36. A cathode electrolyte dry-out barrier 38 is also shown in hatched lines in FIG. 1, secured adjacent an oxidant inlet 40 and between a first side oxidant edge seal 42 and an opposed second side oxidant edge seal 44. It is emphasized that FIG. 1 is only a schematic representation of a fuel cell with an electrolyte dry-out barrier 10 that is not drawn to scale, and instead represents relative positioning of the key elements described above. It is stressed that the anode and cathode electrolyte dry-out barriers 30, 38 are not in the same plane of the cell 10, and hence the hatched lines showing their relative positioning are not to scale. Also, the first reducing fluid edge seal and the first and second side oxidant edge seals 42, 44 are shown schematically in hatched lines only for a portion of the cell necessary to define the relative positions of the dry-out barriers 30, 38, and the actual dimensions of those components are better seen in FIGS. 3 and 4.

Figure 2:
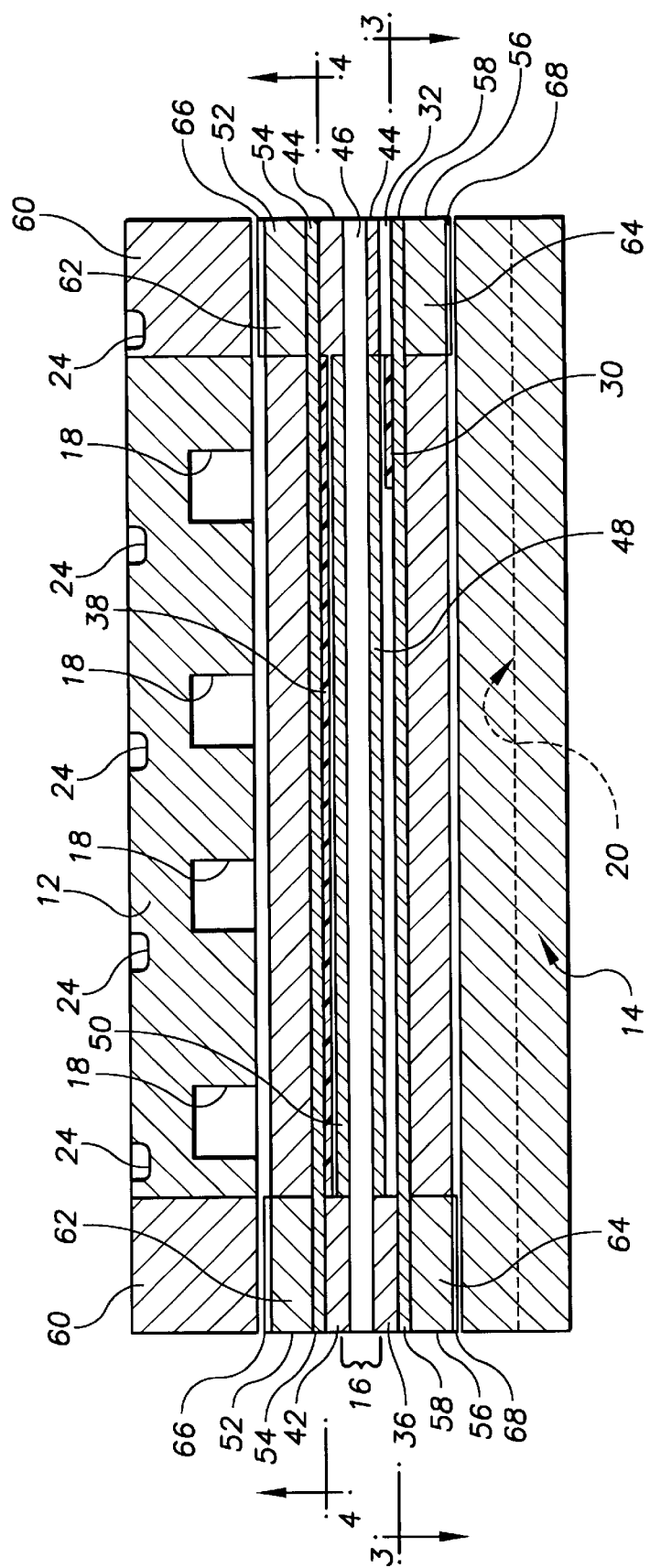
FIG. 2 is a cross-sectional, schematic view of the FIG. 1 fuel cell taken along view line 2—2 of FIG. 1, showing an anode electrolyte dry-out barrier and a cathode electrolyte dry-out barrier of the present invention.

As best shown in FIG. 2, a preferred embodiment of the fuel cell with an electrolyte dry-out barrier 10 includes the MEA 16 disposed between the cathode water transport plate 12 and the anode water transport plate 14. The MEA 16 includes an electrolyte 46, such as a proton exchange membrane ("PEM") well known in the art, secured between an anode catalyst 48 and a cathode catalyst 50. The fuel cell 10 may also include one or more porous cathode layers secured between the cathode water transport plate 12 and the cathode catalyst 50, such as a porous cathode substrate layer 52 and a porous cathode gas diffusion layer 54 secured between the cathode water transport plate 12 and the cathode catalyst 50, as is well known in the art, and which layers are often referred to as an integral bi-layer. Similarly, the fuel cell 10 may also include one or more porous anode layers secured between the anode water transport plate 14 and the anode catalyst 48, such as a porous anode substrate layer 56 and a porous anode gas diffusion layer 58 secured between the anode water transport plate 14 and the anode catalyst 48.

To prevent loss of reactant streams out of the cell 10 through peripheral edges of the above described layers, it is common to seal peripheral edges of the layers as shown in U.S. Pat. No. 6,020,083 that issued on Feb. 1, 2000 to Breault et al., which Patent is assigned to the assignee of all rights in the present invention and which Patent is hereby incorporated herein by reference. For example, a seal peripheral edge 60 of the cathode water transport plate 12, a seal peripheral edge 62 of the cathode porous substrate 52, and a seal peripheral edge 64 of the anode porous substrate 56 may be impregnated with a polymeric or an elastomeric sealant material. Similarly a cathode interfacial seal 66 of similar sealant material may be interposed between peripheral edges of layers between the cathode substrate 52 and the cathode water transport plate 12 and an anode interfacial seal 68 of sealant materials may be interposed between peripheral edges of layers between the anode substrate 56 and the anode water transport plate 14. For example, and as shown in FIG. 2, such a cathode interfacial seal 66 may be disposed between the cathode water transport plate 12 and the cathode substrate layer 52, and an anode boundary 68 seal may be disposed between the anode water transport plate 14 and the anode substrate layer 56, or between peripheral edges of all the layers to restrict movement of reactant streams and/or product fluids from leaving the cell 10 through edges of the cell layers.

It is known to one skilled in the art that a fuel cell utilizing external reactant manifolds only requires edge seals on two edges of each anode and cathode compartment. Such edge seals are incorporated into the edges that are in contact with an opposite reactant. Referring to the view shown in FIG. 2, the cathode seal 62 is exposed to reducing fluid fuel and is necessary. In contrast, the anode seal 64 is exposed to the reducing fluid fuel and is not necessary. If the anode seal 64 were to be eliminated, the anode electrolyte dry-out barrier 30 shown in FIG. 2 would be extended to a beginning point 72 (shown in FIG. 3) of the reducing fluid inlet 32.

For purposes of understanding the present invention, a peripheral region adjacent the anode gas diffusion layer 58 is at a beginning of a flow path of the reducing fluid stream passing through the fuel cell 10 and is characterized as the reducing fluid inlet 32. As shown in FIGS. 1 and 2, and best seen in FIG. 3, the reducing fluid inlet 32 extends from a beginning point 72 of the reducing fluid flow path at a peripheral edge of the gas diffusion layer 58 a distance that is about the same as the extent of the seal edge 64 of the anode substrate 56 and that is perpendicular to the reducing fluid flow path. The reducing fluid inlet may consist of the same elastomer seal material as the boundary seal or seal edge 64, and therefore restricts movement of water out of the electrolyte 46, and also restricts movement of the reducing fluid into contact with the anode catalyst 48. Similarly, an oxidant inlet 40 (shown only in FIGS. 1 and 4) is defined by a peripheral region of the cathode substrate 52 covered with a sealant material, and extends from a beginning point 74 (shown only in FIG. 4) of a flow path of the process oxidant moving through the fuel cell adjacent a peripheral edge of the cathode catalyst 50 a distance that is about the same as the seal edge 62 of the cathode substrate 52 and that is perpendicular to the process oxidant flow path. The oxidant inlet 40 restricts movement of water out of the electrolyte 46, and also restricts movement of process oxidant into contact with the cathode catalyst 50.

The reducing fluid reactant stream passing over the reducing fluid inlet 32 next passes through an anode flow field 75 that directs the reducing fluid to pass adjacent the anode catalyst 48. The anode flow 75 field may be defined as cavities in solid or porous plates adjacent the membrane electrode assembly 16, or in a preferred embodiment as shown in FIGS. 1 and 2, the anode flow field may consist of the fuel inlet and outlet channels 20, 22 defined within the anode water transport plate 14 along with open pores within the anode substrate 56, and anode gas diffusion layer 58. Similarly, the process oxidant stream that passes over the oxidant inlet 40 next passes through a cathode flow field 77 that directs the process oxidant stream to pass adjacent the cathode catalyst 50. The cathode flow field 77 may consist of channels or cavities defined within solid or porous plates, or in a preferred embodiment as shown in FIG. 2, the cathode flow field 77 may consist of air flow or oxidant inlet channels 18 defined within the cathode water transport plate 12 along with open pores within the cathode substrate 52 and the cathode gas diffusion layer 54.

A direction of flow of the reducing fluid through the anode flow field 75 in the preferred embodiment shown in FIG. 3 is represented by directional arrows 76A, 76B, 76C. It is pointed out that directional arrow 76B also represents a turn in the direction of flow of the reducing fluid, and such a turn may be accomplished by a manifold (not shown) secured to the fuel cell 10, as is well known in the art. The reducing fluid flow path through the anode flow field 75 of the fuel cell 10 therefore includes all of an area from the reducing fluid beginning point 72, between the first reducing fluid edge seal 36 and the reducing fluid flow barrier 34, but not the area through the turn represented at 76B, between the reducing fluid flow barrier 34 and a second reducing fluid edge seal 78 and a reducing fluid flow path end point 80 of the flow path adjacent a peripheral edge of the anode catalyst 48. It is to be understood, however, that the invention may apply to a reducing fluid flow path through an anode flow field 75 of a fuel cell that does not include a turn, or that includes a plurality of turns, etc., and that the phrase "reducing fluid flow path" defines a flow path of the reducing fluid from its entry into an anode flow field to its exit from the anode flow field.

A direction of flow of the process oxidant through the cathode flow field 77 is represented in FIG. 4 by directional arrows 82A, 82B, 82C, 82D, to 82E, 82F, 82G, 82H, so that in the preferred embodiment described herein, the process oxidant stream flows roughly straight through the cathode flow field 77 in a direction that is about perpendicular.to flow of the reducing fluid stream through the anode flow field 75. The process oxidant flow path through the cathode flow field 77 therefore includes all of an area from the process oxidant flow beginning point 74, between the first side oxidant edge seal 42 and the second side oxidant edge seal 44 (shown best in FIG. 4), to a process oxidant end point 84 adjacent a peripheral edge of the cathode catalyst 50.

As best seen in FIGS. 2 and 3, the anode electrolyte dry-out barrier 30 is secured between the electrolyte 46 and the anode water transport plate 14 and extends from adjacent the entire.reducing fluid inlet 32 and along the entire reducing fluid flow path through anode flow field 75 a distance that is adequate for the reducing fluid flowing through the anode flow field 75 to become saturated with water that is within the anode flow field 75, such as water from the anode water transport plate 14. Similarly, the cathode electrolyte dry-out barrier 38 is secured between the electrolyte 46 and the cathode water transport plate 12 and extends from adjacent the entire oxidant inlet 40 and along the entire process oxidant flow path through the cathode flow field 77 a distance that is adequate for the process oxidant stream flowing through the cathode flow field 77 to become saturated with water that is within the cathode flow field, such as water from the cathode water transport plate and/or product water generated at the cathode catalyst 50.

By the phrase "adjacent the entire reducing fluid inlet 30 and along the entire reducing fluid flow path" it is meant that the anode electrolyte dry-out barrier 30 overlies an area defined as between the reducing fluid inlet 32, the reducing fluid flow barrier 34, and the first reducing fluid edge seal 36 so that the anode electrolyte dry-out barrier 30 overlies all of that area between those boundaries for the described proportion of the reducing fluid flow path. Likewise, by the phrase "adjacent the entire oxidant inlet 40 and along the entire process oxidant flow path", it is meant that the cathode electrolyte dry-out barrier overlies an area defined as between the oxidant inlet 40, the first side oxidant edge seal 40 and the second side oxidant edge seal 42 so that the cathode electrolyte dry-out barrier 38 overlies all of that area between those boundaries for the described proportion of the process oxidant flow path. For purposes of clarity, it is pointed out that the phrase "flow path" is utilized to designate a two-dimensional area of reactant stream flow, whereas "flow field" describes a three dimensional volume through which the fluid reactant streams may flow. By characterizing the anode and cathode electrolyte dry-out barriers 30, 38 as extending "along the entire [reducing fluid or process oxidant] flow path", it is meant to define the barriers 30, 38 as either layers between the electrolyte 46 and the flow fields 75, 77 that occupy only a portion of the flow fields 75, 77 along the flow paths, or alternatively, as impregnations of the entire flow fields 75, 77 for the described barrier distances of the flow paths.

One skilled in the art would recognize that a length of extension of the anode and/or cathode electrolyte dry-out barrier along the reducing fluid and/or process oxidant flow path is a function of flow path length, temperature and operating pressure of the cell, type and condition of the reducing fluid fuel and/or process oxidant reactant stream, per cent utilization of the reactant stream, extent or reactant stream pre-humidification prior to entering the fuel cell, and average load profile of the fuel cell. It has been found that a preferred distance the anode electrolyte dry-out barrier 30 extends along the reducing fluid flow path is at least six per cent of a length of the reducing fluid flow path, wherein the length of the reducing fluid flow path is from the beginning point 72 of the reducing fluid flow path at the reducing fluid inlet 32 through a shortest distance of the reducing fluid flow path through anode flow field 75 to the end point 80 of the reducing fluid flow path where the reducing fluid leaves the anode flow field 75. A preferred distance the cathode electrolyte dry-out barrier 38 extends along the process oxidant flow path is at least 10 per cent of a length of the process oxidant flow path, wherein the length of the process oxidant flow path is from a beginning point 74 of the process oxidant flow path at the oxidant inlet 40 through a shortest distance of the process oxidant flow path through the cathode flow field 77 to a process oxidant flow path end point 84 where the process oxidant leaves the cathode flow field 77. A most preferred distance the anode electrolyte dry-out barrier 30 extends along the reducing fluid flow path is at least three per cent of a length of the reducing fluid flow path. A most preferred distance the cathode electrolyte dry-out barrier 38 extends along the process oxidant flow path is at least five per cent of a length of the process oxidant flow path.

The anode electrolyte dry-out barrier 30 may be formed by applying a coating or film of a dry-out barrier material to, or impregnating with the dry-out barrier material the anode gas diffusion layer 58 (as shown in FIG. 2), or the anode substrate layer 56, within the above described boundaries relative to the reducing fluid flow path through the fuel cell 10 to define the anode electrolyte dry-out barrier 30. Similarly, the cathode electrolyte barrier 38 may be formed by applying a coating or film of a dry-out barrier material to, or impregnating with the dry-out barrier material the cathode gas diffusion layer 54 (as shown in FIG. 2), or the cathode substrate layer 52, within the above described boundaries relative to the process oxidant flow path through the fuel cell 10 to define the cathode electrolyte dry out barrier 38.

Preferred dry-out barrier materials may be materials well-known in the art that are compatible with a working environment of the fuel cell 10, such as plastic, polymer, elastomer, or resin materials having low water absorption properties, or a compatible metal, wherein the dry-out materials are capable of preventing water from moving through the material, such as preventing water from moving from the electrolyte through the material to the adjacent anode or cathode flow fields 75, 77. Exemplary sealants that may be utilized as dry-out barrier materials are described in the above referenced and incorporated U.S. Pat. No. 6,020,083 as "elastomer sealant materials", such as "FLUOROLAST" grade SB or WB manufactured by Flourolast, a Laureen division, with an inert filler such as silicon carbide, or alternatively, "SLYGARD", manufactured by Dow Chemical Corporation.

A test was conducted to determine the required length of a cathode electrolyte dry-out barrier. A paper was treated with cobalt chloride, which changes color based upon relative humidity, and the paper was placed in contact with a porous cathode gas diffusion layer 54. The gas diffusion layer 54 was supported on a 0.015–0.018 cm. thick porous cathode substrate layer 56. The cathode substrate layer 56 was placed in contact with a porous cathode water transport plate 12. These components were placed between plexiglass blocks that held the components together and which permitted visual observation of the cobalt chloride treated paper. The paper is pink when wet and blue when dry. The plan form dimensions of the components were approximately 15.2 cm. by 30.5 cm., and dry air was passed over this assembly, with the air or oxidant inlet being along the 30.5 cm. dimension.

The test was performed at approximately 65 degrees Celsius. Water was circulated through channels 24 in the cathode water transport plate 12. Dry air was passed through the air flow channels 18 at a rate of 10 liters per minute. That corresponds to an oxidant utilization of forty per cent at a current density of 0.6 amps per square centimeter. It was observed that the cobalt chloride treated paper turned from blue to pink at approximately 2 centimeters down the air or process oxidant flow path through the components. In the experiment, it took a distance of approximately 2 centimeters, or thirteen per cent of the length of the air flow path to fully saturate the reactant process oxidant gas.

The best method to establish an optimal, or required distance of extension of an anode or cathode dry-out barrier along a reducing fluid or process flow path is by performing a test procedure such as the above-described experiment, wherein the test conditions are representative of average operating conditions of the proposed power plant. Therefore, appropriate characterization of the extension of the anode and cathode electrolyte dry-out barriers 30, 38 is that they extend a distance that is adequate to saturate the reactant stream with water. The aforesaid preferred extension for the anode electrolyte dry-out barrier 30 of six per cent of the length of the reducing fluid flow path, and most preferred extension of three per cent of a length of the reducing fluid flow path, and for the cathode electrolyte dry-out barrier the preferred extension of ten per cent and most preferred extension of five per cent, are therefore minimum limits below which it is considered that the anode electrolyte dry-out barrier and cathode electrolyte dry-out barrier simply will not work effectively for any given fuel cell power plant operating conditions.

In use of the fuel cell with an electrolyte dry-out barrier 10, it is to be understood that only an anode 30 or only a cathode electrolyte dry-out barrier 38 may be required, or the anode electrolyte dry-out barrier 30 may be larger than a cathode electrolyte dry-out barrier 38, depending upon anticipated moisture content of reactant streams to be utilized by the fuel cell 10. During operation of the cell, product water is generated at the cathode catalyst 50 which must be moved away from the catalyst 50 to permit the process oxidant stream to maintain contact with the catalyst and thereby avoid flooding of the catalyst. Typically, much of the product water is removed as water vapor and entrained water droplets into the process oxidant stream passing by the catalyst within the cathode flow field 77, thereby assisting in humidifying the process oxidant stream which in turn reduces water loss from and dry out of the electrolyte 46. In contrast, the reducing fluid stream passing by the anode catalyst 48 within the anode flow field 75 receives no such product water, and therefore, the stream remains dryer for a longer distance along the reducing fluid flow path through the fuel cell 10. Consequently, the electrolyte would tend to lose water into the reducing fluid stream for a greater proportion of its flow path through the anode flow field than the process oxidant stream, and the anode electrolyte dry-out barrier 30 would have to be proportionately larger than the cathode electrolyte dry-out barrier 38.

By providing the fuel cell 10 with the anode and/or cathode electrolyte dry-out barriers 30, 38 the fuel cell 10 may receive very dry reducing fluid and process oxidant streams without drying out the electrolyte 46 adjacent the reducing fluid and process oxidant inlets 32, 40. By applying a coating or film of the dry-out barrier material to, or impregnating with the dry-out barrier material appropriate regions of porous layers in the fuel cell between the electrolyte and the anode or cathode flow fields, enhanced performance of the cell is achieved without addition of complicated, costly, and difficult to install internal or external mechanical apparatus. Instead, the fuel cell with an electrolyte dry-out barrier 10 provides enhanced performance without any significant increase in weight, volume, or cost of the fuel cell 10.

While the present invention has been described and illustrated with respect to particular embodiments and methods of manufacture of a fuel cell with an electrolyte dry-out barrier 10, it is to be understood that the present invention is not to be limited to the described and illustrated embodiment. For example, although the fuel cell of the present invention has been primarily described in the context of a "PEM" fuel cell, the cell is applicable to other fuel cells utilizing other solid polymer or aqueous electrolytes. Further, although the invention has been described with a fuel cell that includes the described cathode and anode water transport plates 12, 14, one skilled in the art would recognize that other flow field configurations could be used in the invention, such as described in International Patent Application published under the Patent Cooperation Treaty on Mar. 2, 2000, as International Publication Number WO 00/11744. Additionally, while the drawings and description show utilization of both an anode and cathode electrolyte dry-out barriers, it is within the scope of the invention that a fuel cell may use only an anode electrolyte dry-out barrier 30, only a cathode electrolyte dry-out barrier 38, or both. Accordingly, reference should be made primarily to the following claims rather than the foregoing description to determine the scope of the invention.

What is claimed is:

1. A fuel cell with an electrolyte dry-out barrier for producing electrical energy from reducing fluid and process oxidant reactant streams, the fuel cell comprising:
   a. an anode catalyst and a cathode catalyst secured to opposed sides of an electrolyte;
   b. an anode flow field disposed adjacent the anode catalyst for directing the reducing fluid stream to pass adjacent the anode catalyst and a cathode flow field disposed adjacent the cathode catalyst for directing the process oxidant stream to pass adjacent the cathode catalyst; and,
   c. an anode electrolyte dry-out barrier secured between the electrolyte and the anode flow field for restricting movement of water from the electrolyte into the reducing fluid stream passing through the anode flow field, wherein the anode electrolyte dry-out barrier extends from adjacent an entire reducing fluid inlet that directs the reducing fluid into the anode flow field and along an entire reducing fluid flow path through the anode flow field a distance that is at least six per cent of a length of the reducing fluid flow path, wherein the length of the reducing fluid flow path is from a beginning point of the reducing fluid flow path at the reducing fluid inlet through a shortest distance of the reducing fluid flow path through the anode flow field to the end point of the reducing fluid flow path where the reducing fluid leaves the anode flow field.

2. The fuel cell with an electrolyte dry-out barrier of claim 1, wherein the anode electrolyte dry-out barrier extends along the reducing fluid flow path a distance that is at least three per cent of a length of the reducing fluid flow path.

3. The fuel cell with an electrolyte dry-out barrier of claim 1, further comprising a cathode electrolyte dry-out barrier secured between the electrolyte and the cathode flow field for restricting movement of water from the electrolyte into the process oxidant stream passing through the cathode flow field, wherein the cathode electrolyte dry-out barrier extends from adjacent an entire process oxidant inlet that directs the process oxidant stream into the cathode flow field and along an entire process oxidant flow path through the cathode flow field a distance that is at least ten per cent of a length of the process oxidant flow path, wherein the length of the process oxidant flow path is from a beginning point of the process oxidant flow path at the oxidant inlet through a shortest distance of the process oxidant flow path through the cathode flow field to a process oxidant flow path end point where the process oxidant leaves the cathode flow field.

4. The fuel cell with an electrolyte dry-out barrier of claim 3, wherein the anode electrolyte dry-out barrier extends along the reducing fluid flow path a distance that is at least three per cent of a length of the reducing fluid flow path, and the cathode electrolyte dry-out barrier extends along the process oxidant flow path a distance that is at least five per cent of a length of the process oxidant flow path.

5. The fuel cell with an electrolyte dry-out barrier of claim 1, wherein the anode electrolyte dry-out barrier further comprises a polymeric sealant dry-out barrier material.

6. The fuel cell with an electrolyte dry-out barrier of claim 3, wherein the anode flow field comprises a fuel inlet channel, and open pores of a porous anode layer between the fuel inlet channel and the anode catalyst, the anode electrolyte dry-out barrier comprises a dry-out barrier material coating the porous anode layer, the cathode flow field comprises an oxidant inlet channel and open pores of a porous cathode layer between the oxidant inlet channel and the cathode catalyst, and the cathode electrolyte dry-out barrier comprises the dry-out barrier material coating the porous cathode layer.

7. The fuel cell with an electrolyte dry-out barrier of claim 3, wherein the anode flow field comprises a fuel inlet channel, and open pores of a porous anode layer between the fuel inlet channel and the anode catalyst, the anode electrolyte dry-out barrier comprises a dry-out barrier material impregnating the porous anode layer, the cathode flow field comprises an oxidant inlet channel and open pores of a porous cathode layer between the oxidant inlet channel and the cathode catalyst, and the cathode electrolyte dry-out barrier comprises the dry-out barrier material impregnating the porous cathode layer.

8. A fuel cell with an electrolyte dry-out barrier for producing electrical energy from reducing fluid and process oxidant reactant streams, the fuel cell comprising:

a. an anode catalyst and a cathode catalyst secured to opposed sides of a proton exchange membrane electrolyte;

b. an anode flow field disposed adjacent the anode catalyst for directing the reducing fluid stream to pass adjacent the anode catalyst and a cathode flow field disposed adjacent the cathode catalyst for directing the process oxidant stream to pass adjacent the cathode catalyst;

c. a cathode water transport plate secured adjacent the cathode flow field for directing water to and from the cathode flow field; and, d. a cathode electrolyte dry-out barrier secured between the electrolyte and the cathode water transport plate for restricting movement of water from the electrolyte into the process oxidant stream passing through the cathode flow field, the cathode electrolyte dry-out barrier extending from adjacent an entire process oxidant inlet that directs the process oxidant into the cathode flow field and along an entire process oxidant flow path through the cathode flow field a distance that is at least ten per cent of a length of the process oxidant flow path, wherein the length of the process oxidant flow path is from a beginning point of the process oxidant flow path at the oxidant inlet through a shortest distance of the process oxidant flow path through the cathode flow field to a process oxidant flow path end point where the process oxidant leaves the cathode flow field.

9. The fuel cell with an electrolyte dry-out barrier of claim 8, further comprising an anode water transport plate secured adjacent the anode flow field for supplying water to the reducing fluid stream passing through the anode flow field, and an anode electrolyte dry-out barrier secured between the electrolyte and the anode water transport plate for restricting movement of water from the electrolyte into the reducing fluid stream, the anode electrolyte dry-out barrier extending from adjacent an entire reducing fluid inlet that directs the reducing fluid stream into the anode flow field and along an entire reducing fluid flow path through the anode flow field a distance that is at least six per cent of a length of the reducing fluid flow path.

10. The fuel cell with an electrolyte dry-out barrier of claim 9, wherein the anode electrolyte dry-out barrier extends along the reducing fluid flow path a distance that is at least three per cent of a length of the reducing fluid flow path, wherein the length of the reducing fluid flow path is from a beginning point of the reducing fluid flow path at the reducing fluid inlet through a shortest distance of the reducing fluid flow path through the anode flow field to the end point of the reducing fluid flow path where the reducing fluid leaves the anode flow field, and the cathode electrolyte dry-out barrier extends along the process oxidant flow path a distance that is at least five per cent of a length of the process oxidant flow path.

11. The fuel cell with an electrolyte dry-out barrier of claim 10, wherein the anode electrolyte dry-out barrier and the cathode electrolyte dry-out barrier further comprise polymeric sealant dry-out barrier materials.

12. The fuel cell with an electrolyte dry-out barrier of claim 11, wherein the anode flow field comprises a fuel inlet channel defined within the anode water transport plate and open pores of a porous anode layer between the anode water transport plate and the anode catalyst, the anode electrolyte dry-out barrier comprises a dry-out barrier material coating the porous anode layer, the cathode flow field comprises an oxidant inlet channel defined within the cathode water transport plate and open pores of a porous cathode layer between the cathode water transport plate and the cathode catalyst, and the cathode electrolyte dry-out barrier comprises the dry-out barrier material coating the porous cathode layer.

13. The fuel cell with an electrolyte dry-out barrier of claim 11, wherein the anode flow field comprises a fuel inlet channel defined within the anode water transport plate and open pores of a porous anode layer between the anode water transport plate and the anode catalyst, the anode electrolyte dry-out barrier comprises a dry-out barrier material impregnating the porous anode layer, the cathode flow field comprises an oxidant inlet channel defined within the cathode water transport plate and open pores of a porous cathode layer between the cathode water transport plate and the cathode catalyst, and the cathode electrolyte dry-out barrier comprises the dry-out barrier material impregnating the porous cathode layer.

* * * * *